US007716644B2

(12) United States Patent
Horton et al.

(10) Patent No.: US 7,716,644 B2
(45) Date of Patent: May 11, 2010

(54) ATTRIBUTED DEBUGGING

(75) Inventors: Anson Horton, Sammamish, WA (US); Michael Montwill, Seattle, WA (US); Peter A. Hallam, Seattle, WA (US); Christopher S. George, Issaquah, WA (US); Gang Peng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 812 days.

(21) Appl. No.: 10/808,905

(22) Filed: Mar. 25, 2004

(65) Prior Publication Data

US 2005/0216892 A1    Sep. 29, 2005

(51) Int. Cl.
*G06F 9/44* (2006.01)
(52) U.S. Cl. ...................... 717/125; 717/124
(58) Field of Classification Search .................. 717/126
See application file for complete search history.

(56) References Cited

U.S. PATENT DOCUMENTS

| | | | |
|---|---|---|---|
| 5,740,440 A | 4/1998 | West | |
| 5,815,653 A | 9/1998 | You | |
| 5,892,949 A | 4/1999 | Noble | |
| 6,040,830 A | 3/2000 | Sahoo | |
| 6,275,379 B1 | 8/2001 | Quinno | |
| 6,633,888 B1* | 10/2003 | Kobayashi | 707/103 R |
| 6,915,520 B2 | 7/2005 | Sanchez | |
| 6,928,453 B2 | 8/2005 | Roddy | |
| 6,948,002 B2 | 9/2005 | Chan | |
| 7,191,172 B2 | 3/2007 | McGrath | |
| 7,251,808 B2* | 7/2007 | Bates et al. | 717/125 |
| 7,284,240 B1 | 10/2007 | Fleegal | |
| 7,392,506 B2 | 6/2008 | Garcowski | |
| 7,428,559 B2 | 9/2008 | Hill | |
| 7,516,447 B2 | 4/2009 | Marvin | |
| 2003/0188042 A1 | 10/2003 | Anaya et al. | |
| 2003/0204838 A1 | 10/2003 | Caspole | |
| 2003/0221185 A1* | 11/2003 | Bates et al. | 717/125 |
| 2003/0233636 A1 | 12/2003 | Crawford | |
| 2004/0001092 A1 | 1/2004 | Rothwein | |
| 2004/0172623 A1 | 9/2004 | Eckles | |
| 2004/0230954 A1* | 11/2004 | Dandoy | 717/124 |

OTHER PUBLICATIONS

Auguston et al, A Framework for Automatic Debugging, 17th IEEE International Conference on Automated Software Engineering, 2002, pp. 217-222, Retrieved on [Jan. 25, 2010] Retrieved from the Internet:URL<http://ieeexplore.ieee.org/stamp/stamp.jsp?tp=&arnumber=1115015&isnumber=24593.*

(Continued)

*Primary Examiner*—Tuan Q Dam
*Assistant Examiner*—Cheneca P Smith
(74) *Attorney, Agent, or Firm*—Workman Nydegger (57) ABSTRACT

A system and method facilitating attributed debugging is provided that facilitates a developer of an object to determine what information a debugger displays. An expression evaluator is provided. The system can further include, optionally, a debuggee (e.g., process to be debugged). The debuggee includes attribute(s) which are employed by the debugger to facilitate debugging of the application—"attributed debugging." This allows a developer of a type to declaratively indicate how information is to be displayed during debugging. Attributed debugging thus allows the manipulation of the view of data in the debugger by allowing the type author annotations with which they can control.

19 Claims, 7 Drawing Sheets

OTHER PUBLICATIONS

Crossno et al, Visual Debugging, Computer Graphics and Applications, Nov./Dec. 2002, pp. 6-10, Retrieved on [Jan. 25, 2010], Retrieved from the Internet:URL<http://ieeexplore.ieee.org/search/wrapper.jsp?arnumber=1046622.*

Glenn Ammons, et al., Debugging Temporal Specifications with Concept Analysis, PLDI'03, Jun. 9-11, 2003, pp. 182-195, San Diego, California, USA.

Timothy Jacobs, et al., Interactive Visual Debugging with UML, ACM Symposium on Software Visualization, 2003, pp. 115-122, San Diego, California, USA.

Chanika Hobatr, et al., Using OCL-Queries for Debugging C++, 2001 IEEE, 2001, pp. 839-840.

Raimondas Lencevicius, et al., Query-Based Debugging of Object-Oriented Programs, OOPSLA '97, Oct. 1997, pp. 304-317, Georgia, USA.

Lisa Burnell, et al., Structure and Chance: Melding Logic and Probability for Software Debugging, Communications of the ACM, 1995, 28 pages, vol. 38—Issue 3.

Hayne et al., "Microsoft Computer Dictionary Fifth Edition", 2002, Microsoft Press, Fifth Edition, p. 2.

Shaykat Chadhuri, "Debugging in Visual Studio .NET", Jan. 2002, Retrieved from <http://msdn.microsoft.com,en-us/library/aa290350(vs.71)aspx#vstchdebugginginvisualstudionetanchor2>.

Office Action dated Nov. 5, 2007 cited in U.S. Appl. No. 10/809,147.
Office Action dated May 2, 2008 cited in U.S. Appl. No. 10/809,147.
Office Action dated Dec. 2, 2008 cited in U.S. Appl. No. 10/809,147.
Office Action dated Apr. 29, 2007 cited in U.S. Appl. No. 10/809,147.
Notice of Allowance dated Aug. 28, 2009 cited in U.S. Appl. No. 10/809,147.
Notice of Allowance dated Oct. 26, 2009 cited in U.S. Appl. No. 10/809,147.

* cited by examiner

PRIOR ART

FIG. 3

PRIOR ART

ATTRIBUTED DEBUGGING

CROSS-REFERENCE TO RELATED APPLICATIONS

This application is related to co-pending U.S. utility application Ser. No. 10/809,147 filed on Mar. 25, 2004, entitled PROXY OBJECTS FOR DISPLAY, the entirety of which is incorporated herein by reference.

TECHNICAL FIELD

The present invention relates generally to computer system(s), and, more particularly to debugging of computer process(es).

BACKGROUND OF THE INVENTION

The development of computer software can involve the identification and correction of software anomalies (e.g., "bugs"). These bugs can effect the operation and/or intended function(s) the computer software. Identification and/or correction of bugs can require the expenditure of resources, for example, time and/or labor.

The practice of finding bugs is known as software "debugging". Conventional debugging has taken on many forms, from the simple, for example, manually reviewing software code in an effort to find errant code, to the complex and automated. For example, another computer application known as a "debugger" can operate on and execute software code in a "step-by-step" manner to assist a developer in identifying bug(s).

Conventional debugger(s) include graphical user interface (GUI) debugger(s) that can include an ability to display runtime object data to a developer. However, conventional debugger(s) have been limited in their ability to identify and/or present meaningful information to the developer.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method facilitating attributed debugging. "Attributes" refers to keyword-like tags in which additional information about entities can be specified. Attributes, which are saved with an assembly's metadata, annotate programming elements such as types, fields, methods, and properties. Other applications, such as compiler(s) and/or debugger(s) can refer to the information in attributes to determine how objects should be used.

Perhaps the single most important feature of conventional GUI debugger(s) is their ability to display runtime object data to the developer in a very simple and meaningful way. Prominently displaying values that the developer is most interested has proven extremely difficult for conventional GUI debugger(s) to do. For example, examination of large complicated object(s) with conventional GUI debugger(s) has been a frustrating and daunting task for developer(s). This is due, at least in part, to the inability of the debugger to analyze arbitrary objects and determine what the developer is really interested in viewing.

The system and method of the present invention facilitate a developer of an object to determine what the debugger displays. In accordance with an aspect of the present invention, an attributed debugging system having a debugger with an expression evaluator is provided. The system can further include, optionally, a debuggee (e.g., process to be debugged). The debuggee includes attribute(s) which are employed by the debugger to facilitate debugging of the application—"attributed debugging".

The system can facilitate a developer of a type to declaratively indicate how information is to be displayed during debugging (e.g., "only show this information"). Given that attributes are an extensible, declarative way of conveying runtime information, they can provide a mechanism for allowing the developer to specify that behavior.

Attributed debugging thus allows the manipulation of the view of data in the debugger by allowing the type author annotations with which they can control:

What value should be shown at the top-level for a given type reducing the need to expand the object for additional information;

Whether or not a field or property should be shown at all;

What the value should be shown for a field or property, for example, this value can be the result of an evaluation of an expression;

Whether a type should be shown fully expanded; and/or

More descriptive name or type information, for example, this information can be the result of the evaluation of an expression Thus, attributed debugging is a mechanism by which a component developer can, in a simple way, change the display of an object being debugged. For example, the mechanism can be accomplished by:

Overriding ToString

Annotating code with the DebuggerDisplayAttribute

Annotating code with the DebuggerBrowsableAttribute

In accordance with an aspect of the present invention, the expression evaluator facilitates attributed debugging. The expression evaluator is responsible for evaluating expression(s) of a particular language. For example, there can be different expression evaluator(s) associated with different programming language(s) (e.g., C#, J#, and/or Visual Basic .NET).

In one example, when the expression evaluator is determining what information should be shown about a particular object, field and/or property it looks first to see whether there is an attribute attached, if there is it evaluates that attribute according to the attribute definitions below and modifies the view. If there is no attribute defined it checks for an overridden implementation of ToString, if one exists it invokes that method and uses the result as the value to be displayed for the object, field, or property. Optionally, the expression evaluator can check for subtype(s) as well.

Yet another aspect of the present invention provides for a DebuggerBrowsableAttribute that can be employed to determine how and/or whether a type or member is displayed in the data windows (e.g., never, expanded, collapsed and/or root hidden).

Another aspect of the present invention provides for a DebuggerDisplayAttribute that can be used to control what is displayed for the given class or field in the data windows in the debugger. In one example, a single argument to this attribute is the string that will be displayed in the value column for instance(s) of the type. For example, this string can include text between {and } which can be either a field, property and/or method. For example, an arbitrary expression can be employed; however, in one example, in order to be language agnostic, a field, property and/or method is used.

In one example, there are three other named parameters that can be used to control other parts of the data window display. The "Target" parameter can be used to specify the target type when the attribute is used at the assembly level. In addition, there are the "Name" and "Type" parameters. The "Name" parameter is provided with a string similar to the one used in the constructor, with expressions placed between {and }. The "Type" parameter can be set blank if the type should not be displayed in the data windows.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

"Attributes" refers to keyword-like tags in which additional information about entities can be specified. Attributes, which are saved with an assembly's metadata, annotate programming elements such as types, fields, methods, and properties. Other applications, such as compiler(s) and/or debugger(s) can refer to the information in attributes to determine how objects should be used.

Figure 1:
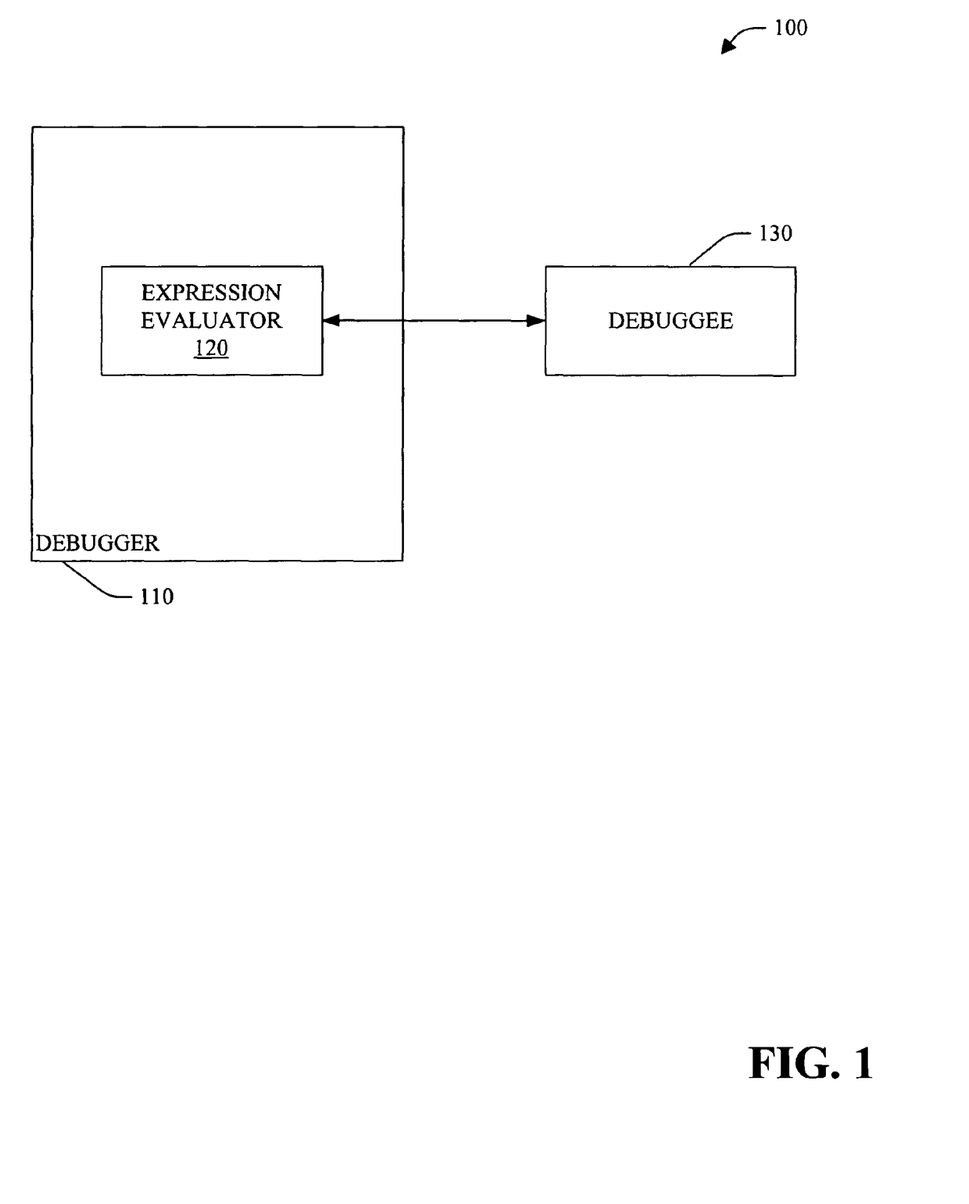
FIG. 1 is a block diagram of an attributed debugging system in accordance with an aspect of the present invention.

Referring to FIG. 1, an attributed debugging system 100 in accordance with an aspect of the present invention is illustrated. The system 100 includes a debugger 1 10 having an expression evaluator 120. The system 100 further includes a debuggee 130 (e.g., process to be debugged). The debuggee 130 includes attribute(s) which are employed by the debugger 110 to facilitate debugging of the application—"attributed debugging".

Attributed debugging is the concept of allowing a developer of a type, the same developer who understands and specifies the runtime behavior of that type, to also specify what that type will look like when it's being debugged. Consider for a moment a DateTime structure. This structure is a representation of a particular moment in time stored as the month, day, year, hour, minute, second, and millisecond. This structure contains a set of useful methods which allow the manipulation of that moment, adding and subtracting time, converting to a different representation like a Julian date, even converting to a system specific number of 'ticks'. To a consumer of this structure the only information that is important is what moment is being stored; however, in order to perform the calculations offered by the various methods there are several implementation specific values that need to be stored, for example, the number of 'ticks' in a millisecond. Traditionally, there would be no way for the structure author to communicate this to the debugger 110 such that the consumer would need to see these values, despite not being interested in their contents.

The system 100 can facilitate a developer of a type to declaratively indicate how information is to be displayed during debugging (e.g., "only show this information"). Given that attributes, as referred to in this application, are an extensible, declarative way of conveying runtime information, they can provide a mechanism for allowing the developer to specify that behavior.

Attributed debugging thus allows the manipulation of the view of data in the debugger 110 by allowing the type author annotations with which they can control:

What value should be shown at the top-level for a given type reducing the need to expand the object for additional information;

Whether or not a field or property should be shown at all;

What the value should be shown for a field or property, for example, this value can be the result of an evaluation of an expression;

Whether a type should be shown fully expanded; and/or

More descriptive name or type information, for example, this information can be the result of the evaluation of an expression Thus, attributed debugging is a mechanism by which a component developer can, in a simple way, change the display of an object being debugged. For example, the mechanism can be accomplished by:

Overriding ToString

Annotating code with the DebuggerDisplayAttribute

Annotating code with the DebuggerBrowsableAttribute

As noted previously, the debugger 110 includes an expression evaluator 120. Conventional expression evaluators have a simplistic type viewer definition mechanism built-in, for example, in the form of the autoexp.dat (csee.dat, mcee.dat) files. Unfortunately, these files are very limited, in essence, nothing more then a rudimentary filtration system allowing certain data to be eliminated from the view, but generally nothing to be added. In addition, these files have been severely under-documented. Finally, the .dat files require that the changes be made on the end consumer's machine; yet, often the consumer of a component and the developer of a component are different people. Because of these short-comings, the usage of the conventional .dat files is quite small.

In accordance with an aspect of the present invention, the expression evaluator 120 facilitates attributed debugging. The expression evaluator 120 is responsible for evaluating expression(s) of a particular language. For example, there can be different expression evaluator(s) 120 associated with different programming language(s) (e.g., C#, J#, and/or Visual Basic .NET).

In one example, when the expression evaluator 120 is determining what information should be shown about a particular object, field and/or property it looks first to see whether there is an attribute attached, if there is it evaluates that attribute according to the attribute definitions below and modifies the view. If there is no attribute defined, the expression evaluator 120 invokes "ToString", for example, to display value(s) for the object, field, or property.

Optionally, the expression evaluator 120 can check for subtypes as well. For example,

TABLE 1

```
[DebuggerDisplay("X = {x}")]
class Base
{
public int x = 20;
}
class Derived: Base
{
public override string ToString( )
{
return "Hello";
}
}
class Program
{
static void Main( )
{
Derived d = new Derived( );
// Examine d in debugger
}
}
```

In this case the debugger 110 would show "X=20" for d. If the DebuggerDisplay attribute is removed from Base, then the debugger 110 would show "Hello" for d.

DebuggerBrowsableAttribute

The DebuggerBrowsableAttribute can be employed to determine how and/or whether a type or member is displayed in the data windows. For example, the constructor can take an enumeration which specifies states.

In one example, these states are: never, expanded, collapsed and/or root hidden. The enumeration "never" indicates that the type or member should not be shown in the data window. For example, placing this on the _count field of an ArrayList would remove that item from the hierarchy such that when the developer clicked the + to their ArrayList instance, the expansion wouldn't list the field.

The enumeration "expanded" indicates that, if a type is hierarchical, it should be expanded by default. For example, assume an Employees class contains a Hashtable named Information which stores employee names as the key, and a CustomerData object as the value. If Information was 'Expanded' then when the developer clicked on the + next to their Employees instance, the CustomerData would be expanded for them.

"Collapsed" is the opposite of the Expanded enumeration member. It indicates that a particular element shouldn't be expanded by default. In one example, this is the default value of the enumeration.

Finally, "RootHidden" indicates that the target element itself should not be shown, but should instead be automatically expanded to have its top members displayed.

For example:

TABLE 2

```
public enum DebuggerBrowsableState { Never, Expanded, Collapsed, RootHidden }
   [AttributeUsage (AttributeTargets.Field | AttributeTargets.Property, AllowMultiple = true)]
   public sealed class DebuggerBrowsableAttribute : Attribute
   {
      private DebuggerBrowsableState state;
      public DebuggerBrowsableAttribute (DebuggerBrowsableState state)
      {
         this.state = state;
      }
      public DebuggerBrowsableState State
      {
         get { return state; }
      }
   }
```

DebuggerDisplayAttribute

The DebuggerDisplayAttribute can be used to control what is displayed for the given class or field in the data windows in the debugger 110. In one example, a single argument to this attribute is the string that will be displayed in the value column for instance(s) of the type. For example, this string can include text between {and } which can be either a field, property and/or method. For example, an arbitrary expression can be employed; however, in one example, in order to be language agnostic, a field, property and/or method is used.

In the C# case, a general expression can be allowed which has implicit access to the pointer for the current instance of the target type. The expression can be limited, however, with no access to aliases, locals and/or pointers. In addition, attributes on properties referenced in the expression are not processed.

For example:

TABLE 3

[DebuggerDisplay("x = {x} y = {y}")] can be used on a type which has fields x and y to indicate that a string of the form "x=5 y=18" be displayed in the value column.
[DebuggerDisplay("String value is {toString( )}")] will call the ToString( ) and produce "String value is [5, 6, 6]".
[DebuggerDisplay("Object {count − 2}: {(flag) ? \"yes\" : \"no\"}")] results in a display, for example, like "Object 6: yes".

Traditional fields displayed in the debug window include: instanceName, value, and type. Setting the 'value' changes what's displayed in the value field (column), setting the 'Name' changes what's displayed in the instranceName column, and changing the 'Type' changes what's displayed in the Type column. Generally, the value field displays a value returned by ToString which can be helpful to a developer has overridden the ToString, as described here.

In one example, there are three other named parameters that can be used to control other parts of the data window display. The "Target" parameter can be used to specify the target type when the attribute is used at the assembly level. In addition, there are the "Name" and "Type" parameters. The "Name" parameter is provided with a string similar to the one used in the constructor, with expressions placed between {and }. The "Type" parameter can be set blank if the type should not be displayed in the data windows. For example, to prevent confusion, these named parameters can be used on a type which is being used as a type proxy, discussed below.

For example:

TABLE 4

```
[AttributeUsage (AttributeTargets.Class | AttributeTargets.Struct |
AttributeTargets.Delegate | AttributeTargets.Enum | AttributeTargets.Field
| AttributeTargets.Interface | AttributeTargets.Property |
AttributeTargets.Assembly, AllowMultiple = false)]
    public sealed class DebuggerDisplayAttribute : Attribute
    {
      private string name;
      private string value;
      private string type;
      private Type target;
      public DebuggerDisplayAttribute (string value)
      {
        this.value = value;
      }
      public string Value
      {
        get { return this.value; }
      }
      public string Name
      {
        get { return name; }
        set { name = value; }
      }
      public string Type
      {
        get { return type; }
        set { type = value; }
      }
      public Type Target
      {
        get { return target; }
        set { target = value; }
      }
    }
```

DebuggerTypeProxyAttribute

The system 100 can, optionally, employ additional attribute(s), for example, DebuggerTypeProxy attribute(s) as discussed in greater detail in co-pending U.S. utility application Ser. No. 10/809,147, filed on Mar. 25, 2004 and entitled "PROXY OBJECTS FOR DISPLAY".

Briefly, the DebuggerTypeProxyAttribute can be used to specify the "display proxy" of the type. For example, it can allow a developer to specify a particular viewer with the type on which it occurs. This attribute can be used at the assembly level as well, in which case the Target parameter specifies the type for which a proxy will be used. In general, this attribute specifies a private nested class which occurs within the type that the attribute is placed on is targeting. In one example, a particular expression evaluator 120 which supports type viewers will look for this attribute when a type is being displayed, if it is found, the expression evaluator substitutes the display type instead. That is, the expression evaluator will construct another object of the display type by passing the object to its constructor. The expression evaluator will then examine the display object instead."

In one example, only the public members of the display type are displayed by the debugger 110, such that substantially all private implementation of the display proxy are hidden without the use of the DebuggerBrowsableAttribute. Data window behavior with attribute-enhanced views mirrors that of the undecorated views—for example, drag and drop can work in a conventional manner.

Further, in one example, in order not to incur unnecessary performance penalties, the expression evaluator 120 does not examine the attributes on the display proxy of the type unless the type is expanded (e.g., either through the user clicking the +next to the type in a data window and/or through the use of the DebuggerBrowsableAttribute described previously). Therefore, in this example, generally no attributes are placed on the display type; however, attributes can be placed within the body of the display type.

Overriding attributes

In accordance with another aspect of the present invention, attribute(s) which are provided with the assembly can be overridden, even if the developer doesn't have the source code. In one example, the same attributes used in the source (as described above) can be used at the assembly level with the Target parameter. For example, the assemblies with these attributes can be placed into a specified folder and the debugger 110 processes them.

Installation

As mentioned previously, attribute(s) can be placed on types for the purposes of display even if the source code for the types isn't available. This can be accomplished, for example, by creating an assembly which has a set of assembly level attributes (e.g., the same attributes that would have originally been placed on the types) which have an additional named parameter called Target. Target simply takes the type on which to apply the attribute.

Conventionally, customizations to the data windows of the debugger were stored in a .dat file, per expression evaluator. In accordance with an aspect of the present invention, the debugger 110 loads assemblies from a specific cached directory. Upon installation of a development environment, the directory is created in the user's documents location and then checked for DLLs at debug-time, for example:

c:\Documents and Settings\<username>\My Documents\development environment\Visualizers In this example, if an attribute is specified in this directory, it takes precedence over an attribute defined directly on the type.

In one example, a caching mechanism is employed such that an assembly can be copied into the directory and the attributes are then loaded; however, the caching mechanism ensures that an assembly doesn't need to be opened for metadata when a debug session is started. Instead a trivial check can be performed to ensure that the current directory matches the last cached state, assuming it does then only the cache is used to determine whether an attribute on a particular type is present. If it doesn't, then the cache is rebuilt.

It is to be appreciated that the system 100, the debugger 110, the expression evaluator 120 and/or the debuggee 130 can be computer components as that term is defined herein.

Figure 2:
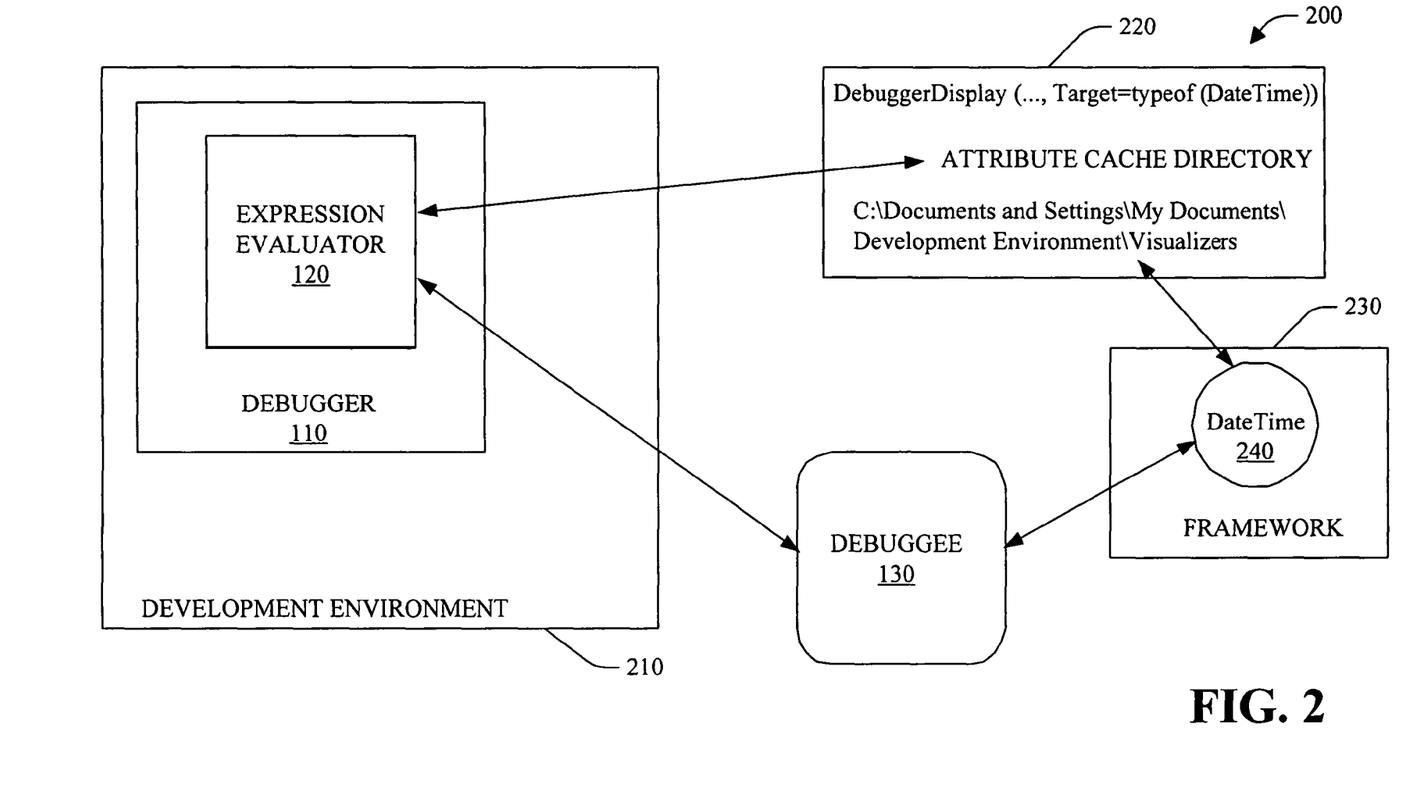
FIG. 2 is a block diagram of a debug system in accordance with an aspect of the present invention.

Next, referring to FIG. 2, a debug system 200 in accordance with an aspect of the present invention is illustrated. The system 200 includes a development environment 210 having a debugger 110 that includes an expression evaluator 120. The system further includes an attribute cache directory 220, a framework 230 having a construct 240 (e.g., DateTime), and, a debuggee 130.

The expression evaluator 120 is loaded by the debugger 110, which itself, is a component of the development environment 210. When debugging, the debugger 110 is attached to the debuggee 130 (e.g., the process being debugged). The expression evaluator 120 is responsible for evaluating expression(s) in the debuggee 130. The expression evaluator 120 checks the attribute cache directory 220, and, in this example, happens to find an assembly level attribute, DebuggerDisplay for DateTime. The Debuggee 130 uses DateTime. When the expression evaluator 120 is asked to display a DateTime it evaluates the expression given by the DebuggerDisplayAttribute in the attribute cache directory 220.

Turning to FIGS. 3-6, an exemplary attributed debugging scenario in accordance with an aspect of the present invention is illustrated. In this example, a developer is creating a line graph by plotting a larger number of Points. The Point is declared as follows, without any attribute(s):

TABLE 5

```
struct Point
{
    int x;
    int y;
    public int X
    {
        get { return x; }
        set { x=value; }
    }
    public int Y
    {
        get { return y; }
        set { y=value; }
    }
}
```

Figure 3:
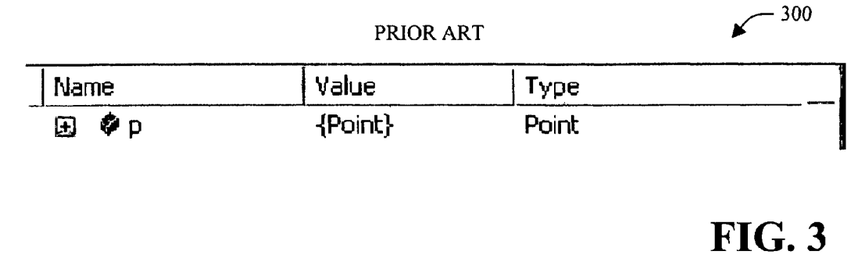
FIG. 3 is a diagram of an exemplary conventional user interface.

Next, the developer creates a single point to make sure everything is working:

Point p=new Point ();

p.X=20;

p.Y=100;

The developer then debugs the application to see what value the p has. Referring briefly to FIG. 3, an exemplary conventional user interface 300 is illustrated. For example, the developer can employ the user interface 300 in order to examine the value of p. In this example, the developer notices that the value column only tells the developer that it's a {Point}, the same information that is available in the Type column. In order to see the actual position of the point, the developer must expand p to see x and y.

Figure 4:
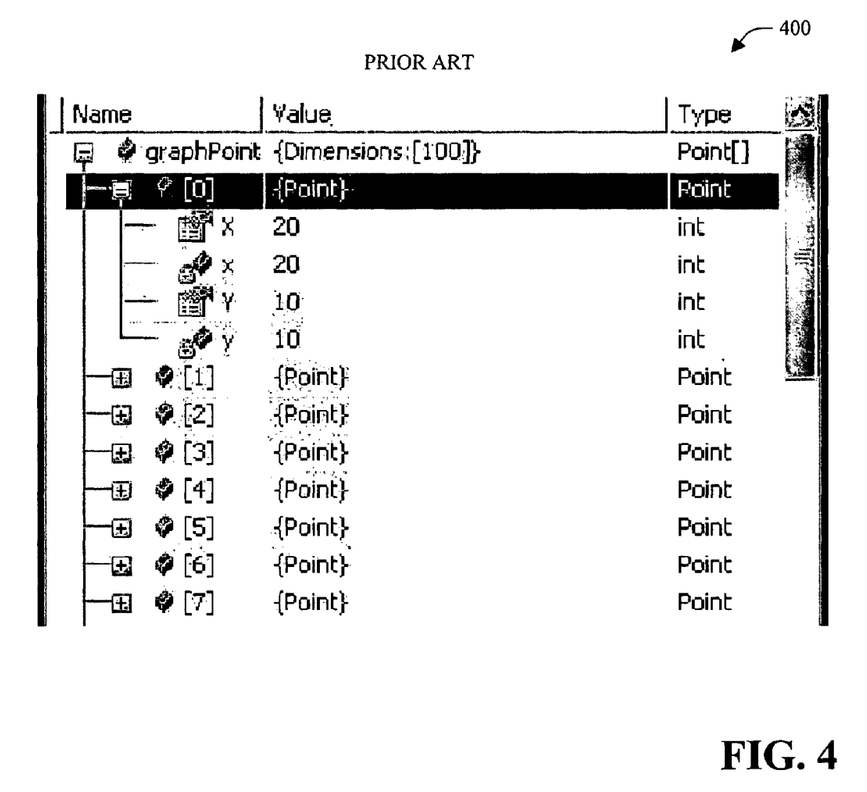
FIG. 4 is a diagram of an exemplary conventional user interface

Though slightly frustrated with that, the developer decides to continue working on his graph. He now creates an array of 100 points:

Point [ ] graphPoints=new Point [100];

Referring briefly to FIG. 4, an exemplary conventional user interface 400 is illustrated. Continuing on, the developer notices that when debugging this structure, the problem of having to expand the Point to see its values is much more disconcerting.

In accordance with an aspect of the present invention, the developer can modify the developer's type declaration in the following manner:

[DebuggerDisplay ("X={x}, Y={y}")]

Figure 5:
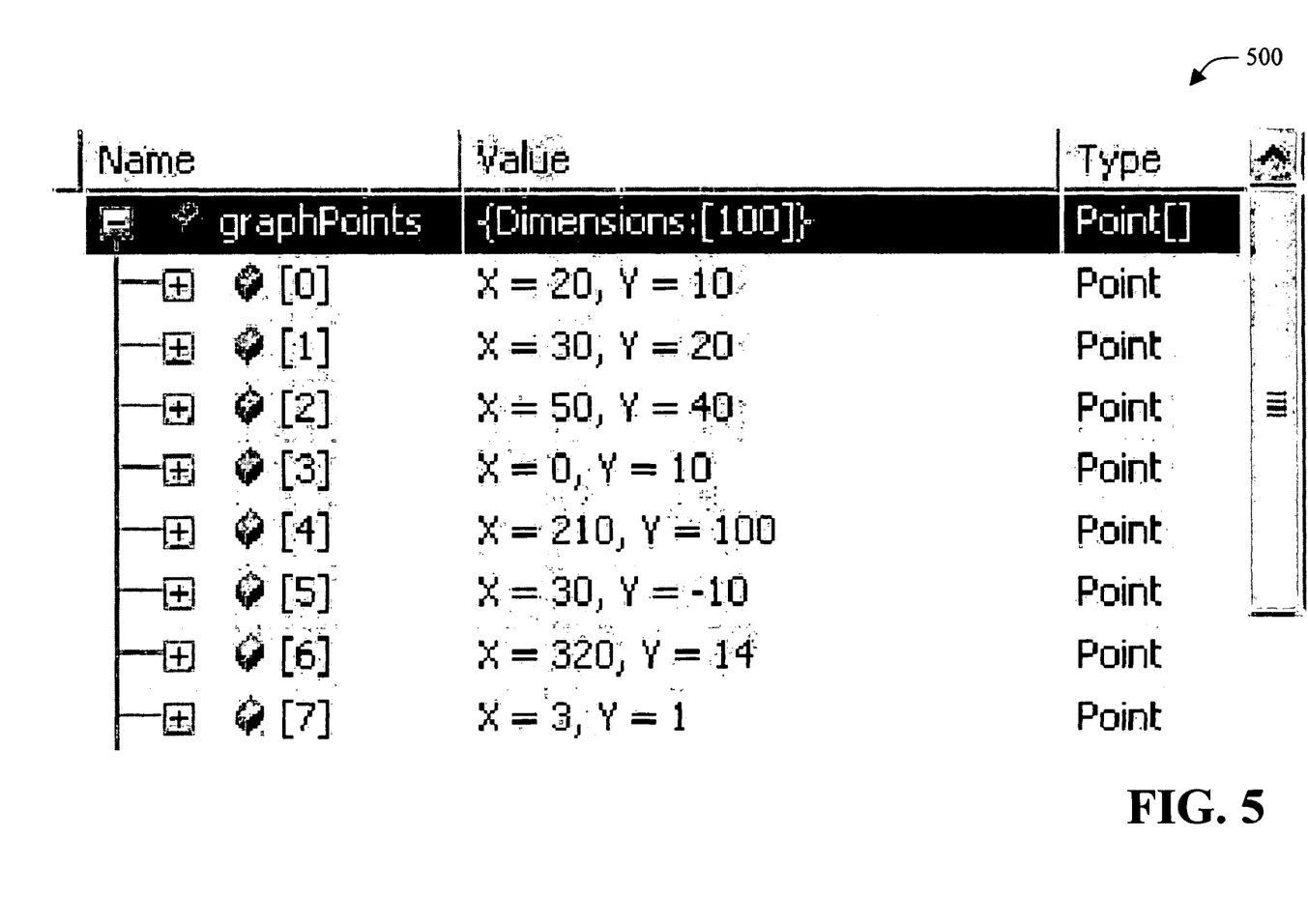
FIG. 5 is a diagram of an exemplary user interface in accordance with an aspect of the present invention.

Turning to FIG. 5, an exemplary user interface 500 in accordance with an aspect of the present invention is illustrated. Based, at least in part, upon this declaration, the developer is able to examine the array in the debugger in a much more natural and useful view.

Having examined a convenient first view of the points, the developer can further edit them in accordance with an aspect of the present invention. For example, the developer can find it annoying that the debugger is showing X, Y and x, y since they will have the same values. Thus, in accordance with an aspect of the present invention, the developer can further modify his code to include the DebuggerBrowsable attribute described previously:

TABLE 6

```
[DebuggerDisplay ("X={x}, Y={y}")]
struct Point
{
    [DebuggerBrowsable (DebuggerBrosableState.Never)]
    int x;
    [DebuggerBrowsable (DebuggerBrowsableState.Never)]
    int y;
    public int X
    {
        get { return x; }
        set { x= value; }
    }
    public int Y
    {
        get { return y; }
        set { y=value; }
    }
}
```

Figure 6:
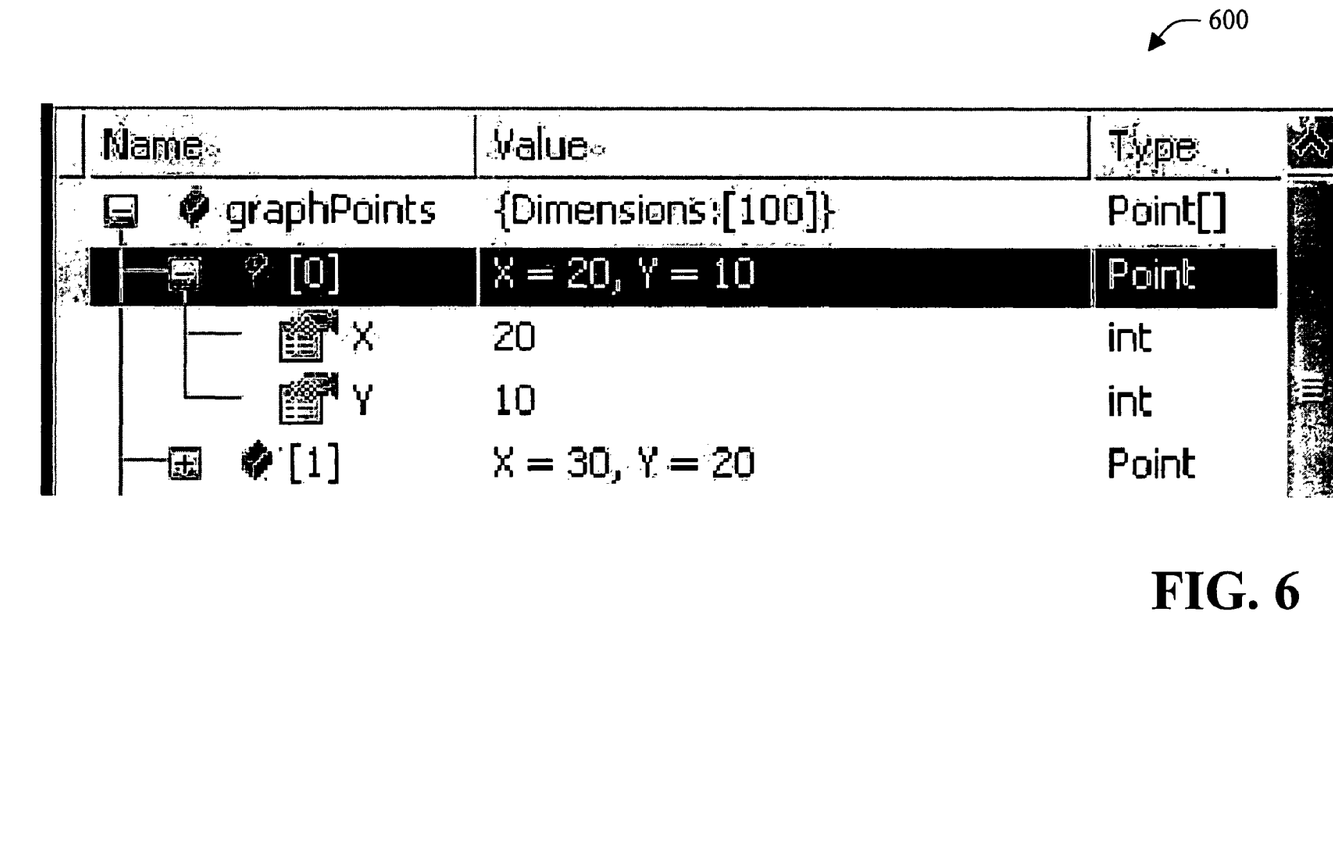
FIG. 6 is a diagram of an exemplary user interface in accordance with an aspect of the present invention.

Referring briefly to FIG. 6, an exemplary user interface 600 in accordance with an aspect of the present invention is illustrated. Continuing on, when the developer debugs the graphPoints array, the developer can employ the user interface 600 to edit value(s).

Those skilled in the art will recognize that the system 100 has been described with respect to data windows having a hierarchical view that displays, for example, name, value and type information. However, the present invention is not limited to the hierarchical view.

Thus, in accordance with an aspect of the present invention, attributed debugging can be employed with any suitable additional information to be shown at debug time (e.g., a glyph for a particular member can be displayed). An attribute that controls the glyph shown can be employed to manipulate the glyph.

It is to be appreciated that any type of attributed debugging suitable for carrying out the present invention can be employed and all such types of attributed debugging is intended to fall within the scope of the hereto appended claims.

Figure 7:
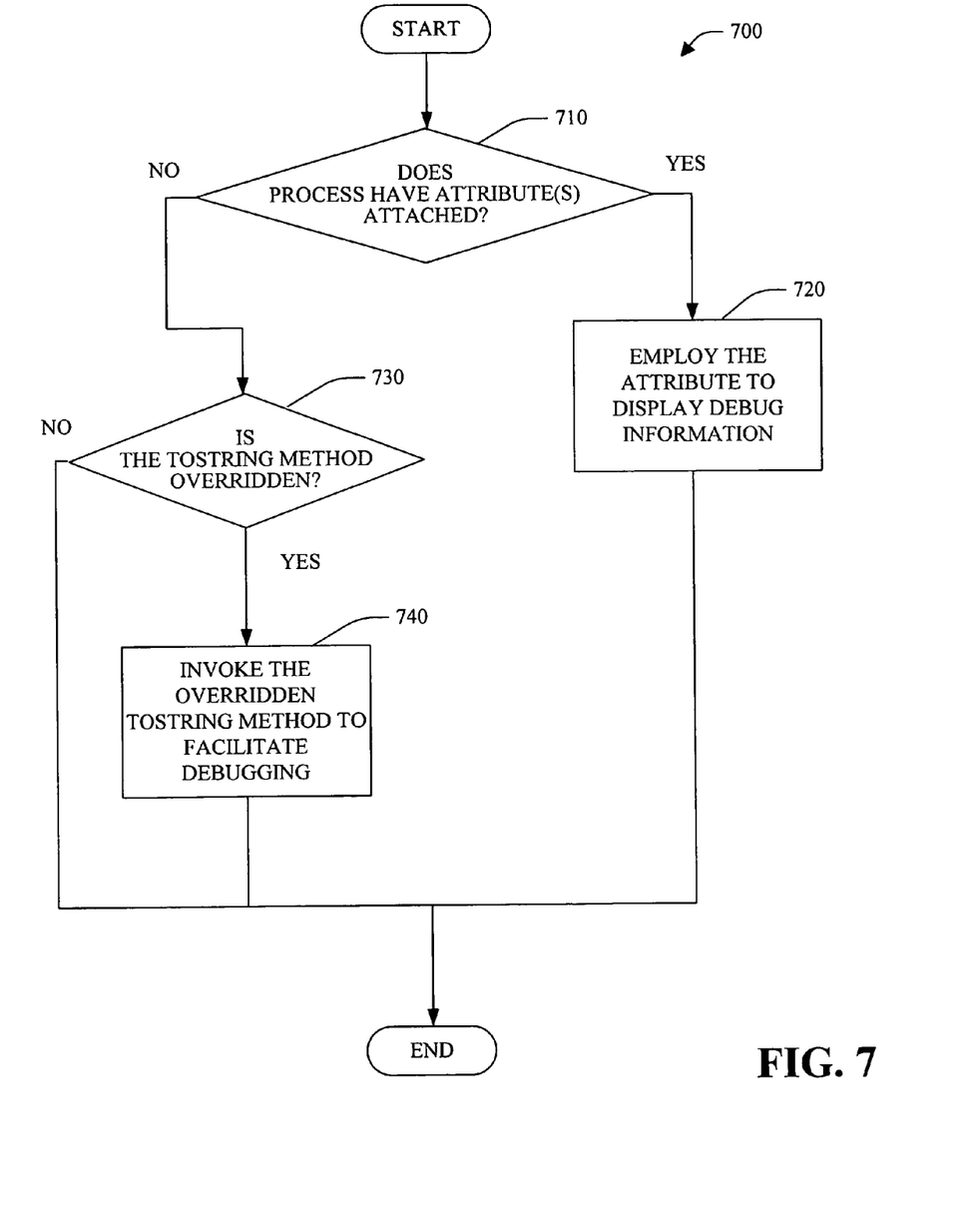
FIG. 7 is a flow chart of a method facilitating attributed debugging in accordance with an aspect of the present invention.

Turning briefly to FIG. 7, a methodology that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 7, a method facilitating attributed debugging 700 in accordance with an aspect of the present invention is illustrated. At 710, determination is made as to whether a process has attribute(s) attached to it. If the determination at 710 is YES, at 720, the attribute(s) are employed to display debug information (e.g., DebuggerBrowsableAttribute and/or DebuggerDisplayAttribute), and, no further processing occurs.

If the determination at 710 is NO, at 730, a determination is made as to whether a ToString method has been overridden. If the determination at 730 is YES, at 740, the overridden ToString method is invoked to facilitate debugging, and, no further processing occurs. If the determination at 730 is NO, no further processing occurs.

Figure 8:
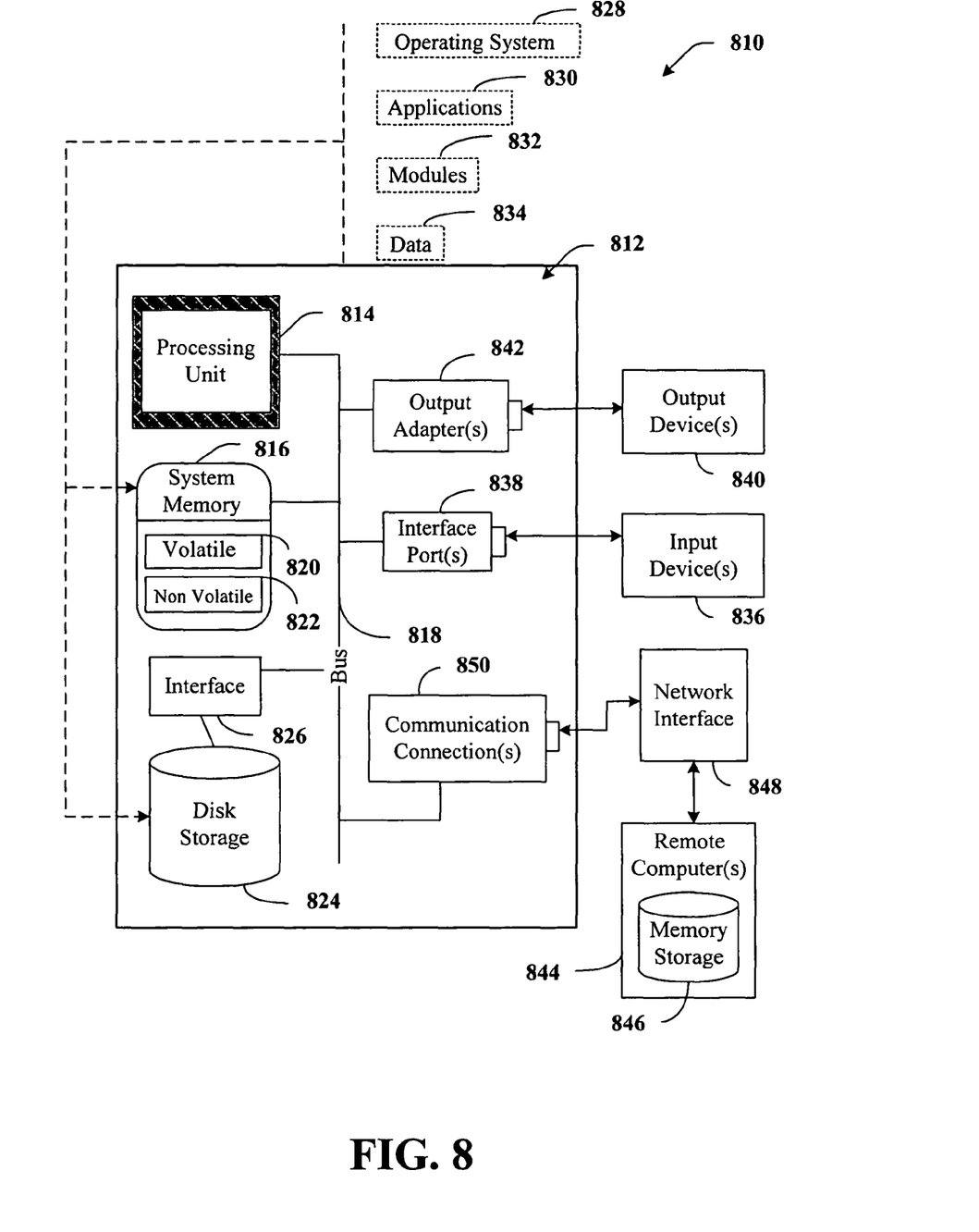
FIG. 8 illustrates an example operating environment in which the present invention may function.

In order to provide additional context for various aspects of the present invention, FIG. 8 and the following discussion are intended to provide a brief, general description of a suitable operating environment 810 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system to facilitate attributed debugging for debugging a computer software application, the computing system comprising:
    a processor; and
    a computer readable storage medium storing the following components:
        a debugger that facilitates debugging of a computer software application;
        a debuggee that includes one or more attributes associated with the computer software application, which attributes are employed by the debugger to facilitate debugging of the software application, wherein the attributes annotate one or more of a type, field, method, or property of the software application, and wherein each of the one or more attributes contains a field, property, or method that is evaluated during debugging to customize display of corresponding annotated type, field, method, or property; and,
        an expression evaluator that evaluates the field, property, or method of each of the one or more employed; attributes, and presents debug information representing the corresponding annotated type, field, method, or property based on the evaluation of the field, property, or method within the evaluated attribute.

2. The system of claim 1, wherein the expression evaluator evaluates an expression associated with a particular programming language.

3. The system of claim 2, wherein the programming language is at least one of C#, J# or Visual Basic.Net.

4. The system of claim 2, wherein the computer readable storage medium stores a plurality of expression evaluators, each expression evaluator associated with a particular programming language.

5. The system of claim 1, wherein the field, property, or method of one or the one or more attributes is an overridden implementation of a ToString method, and wherein the expression evaluator invokes the overridden implementation of the ToString method to present the debug information for the corresponding annotated type, field, method, or property.

6. The system of claim 5, wherein the expression evaluator employs a result of the overridden ToString method as a value to be displayed with the debug information.

7. The system of claim 1, wherein at least one of the one or more attributes specifies at least one of how and whether the corresponding annotated type, field, method, or property is displayed during debugging.

8. The system of claim 7, wherein at least one of the one or more attributes employs an enumeration.

9. The system of claim 8, wherein one enumeration value associated with an indication specifies that the corresponding annotated type, field, method, or property should not be displayed to the developer.

10. The system of claim 8, wherein one enumeration value associated with an indication specifies that if a type is hierarchical, it should be expanded by default.

11. The system of claim 8, wherein one enumeration value associated with an indication specifies that a type should not be expanded by default.

12. The system of claim 8, wherein one enumeration value associated with an indication specifies that a target element itself should not be shown, but should instead be automatically expanded to have its member(s) displayed.

13. The system of claim 1, wherein at least one of the one or more attributes includes a string in conjunction with the field, property, or method which string is displayed in conjunction with the results of the evaluated field, property, or method.

14. The system of claim 13, wherein the string is displayed in a value column for an instance of a corresponding class or field.

15. The system of claim 1, further comprising an attribute cache directory that stores an attribute associated with the computer software application, the expression evaluator employing the stored attribute to present debug information.

16. A computer readable storage medium storing the computer executable components of claim 1.

17. A computer-implemented method for facilitating debugging a computer software application using attributed debugging, the method comprising:
    determining that a type, field, method, or property of a computer software application has an attribute attached thereto, wherein an attribute; annotates one or more of a type, field, method, or property of the software application, and wherein each attribute contains a field, property, or method that is evaluated during debugging to customize display of the corresponding annotated type, field, method, or property;

evaluating the field, property, or method of the attached attribute; and displaying debug information representing the corresponding annotated type, field, method, or property based on the evaluation of the field, property, or method within the evaluated attribute.

18. The method of 17, further comprising at least one of the following:

determining that a ToString method has been overridden; and, invoking the overridden ToString method to generate the debug information that is displayed.

19. A computer readable storage medium having stored thereon computer executable instructions for carrying out the method of claim 17.

* * * * *